United States Patent Office 3,534,056
Patented Oct. 13, 1970

3,534,056
FLUORO-ALKYL PYRIDINES AND THEIR PREPARATION
Everett A. Mailey, Norristown, and Luke R. Ocone, Philadelphia, Pa., assignors to Pennwalt Corporation, Philadelphia, Pa., a corporation of Pennsylvania
No Drawing. Filed Mar. 2, 1967, Ser. No. 619,911
Int. Cl. A01n 9/22; C07d 31/26
U.S. Cl. 260—295.5                3 Claims

ABSTRACT OF THE DISCLOSURE

An alpha-substituted derivative of a carbocyclic nitrogen-containing compound is prepared by reacting an N-oxide of a carbocyclic compound with a monosubstituted fluoroethylene having at least 3 carbon atoms and the formula $RCF=CF_2$ where R is an aliphatic group. The reaction is illustrated by that of pyridine N-oxide with hexafluoropropene to produce 2-(1,2,2,2-tetrafluoroethyl)-pyridine. The substituted carbocyclic nitrogen-containing compounds are useful as plant growth regulators.

---

This invention relates to a new class of alpha-substituted derivatives of carbocyclic nitrogen-containing compounds wherein a nitrogen atom is a member of the carbocyclic ring, which ring contains from 4 to 9 carbon atoms and in which a carbocyclic carbon atom in a position alpha to said ring nitrogen atom has a substituent represented by —CHFR where R is an aliphatic organic group having 1 to about 18 carbon atoms. This invention also relates to the method of preparing said derivatives whereby the N-oxide derivative of a carbocyclic nitrogen-containing compound of 4 to 9 ring carbon atoms, in which compound said nitrogen atom is a member of the carbocyclic ring, and in which compound a carbocyclic carbon atom having a hydrogen substituent is in alpha position to said nitrogen atom, is reacted with a monosubstituted fluoroethylene having the formula $RCF=CF_2$ where R is an aliphatic organic group of 1 to 18 carbon atoms. In the preferred embodiments of this inventor R is a perfluoroalkyl or perfluorochloroalkyl radical having 1 to 18 carbon atoms. A perfluoroalkyl radical means an alkyl radical containing only carbon and fluorine, and a perfluorochloroalkyl radical means an alkyl radical containing only carbon, fluorine and chlorine wherein the ratio of fluorine to chlorine atoms is at least 1:1. Also, in preferred embodiments of this invention, the carbocyclic compound is a pyridinyl compound, i.e., the N-oxide is a pyridinyl N-oxide. In these specific embodiments, the new compounds can be represented by the general formula

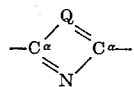

where N is the pyridyl nitrogen atom, the $C^\alpha$'s are the carbon atoms of the carbocyclic radical which are in alpha position to the pyridyl nitrogen atom, Q is the moiety which when combined with the

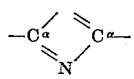

moiety, completes the carbocyclic ring of the pyridyl radical, and R is as defined above.

The reaction embodied in the present invention is illustrated by that of a pyridine N-oxide with a substituted fluoroethylene as follows:

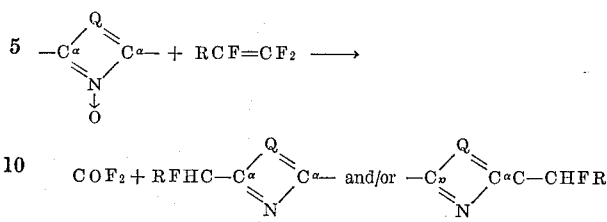

where Q, R and $C^\alpha$ are as defined previously and at least one of the $C^\alpha$'s in the starting pyridine N-oxide compound has a hydrogen substituent. The foregoing general reaction is exemplified in its simplest embodiment by the reaction of unsubstituted pyridine N-oxide with hexafluoropropene to provide 2-(1,2,2,2-tetrafluoroethyl)pyridine, viz.

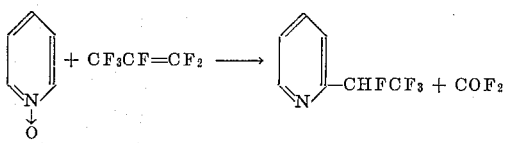

As seen in the above pictorializations, the reaction of this invention involves a unique and unexpected chemical mechanism wherein an alpha hydrogen atom of the carbocyclic N-oxide compound becomes bonded to the carbon atom of the fluoroalkyl group, which carbon atom attaches to the corresponding alpha carbon atom of the pyridine moiety. The oxygen atom joins with a $CF_2$ moiety to form by-product carbonyl fluoride. The fluoroalkyl substituent of the pyridine derivative which is thereby produced thus has one fewer carbon atom than the substituted fluoroethylene reactant. The co-product carbonyl fluoride is a valuable chemical intermediate of commercial importance.

The carbocyclic N-oxide precursor of the compounds embodied herein has, as previously mentioned, at least one hydrogen atom on an alpha carbon atom. The carbocyclic N-oxide compound can be mono- or multi-substituted and such substituents can be, for example, from the group consisting of alkyl having one to 18 carbon atoms, carboxyl, carboxylate, amino, ether, amide, hydroxyl, halogen, and other substituents. Representative carbocyclic N-oxide compounds embodied in the process of this invention are pyridine N-oxide, quinoline N-oxide, pyrimidine N-oxide, pyridazine N-oxide, naphthyridine N-oxide, quinoxaline N-oxide, quinazoline N-oxide, pyrazine N-oxide, the picoline N-oxides, nicotinic acid N-oxide, 4-methoxypyridine N-oxide, 4-hydroxylpyridine N-oxide, 4-carbethoxypyridine N-oxide, 4-aminopyridine N-oxide, 4-carboxaminodopyridine N-oxide, 8-hydroxyquinoline N-oxide, 4-chloropyridine N-oxide, phthalazine N-oxide, and like compounds. Representative monosubstituted fluoroethylene reactants embodied herein ($RCF=CF_2$) are the following: hexafluoropropene, perfluorobutene, perfluorohexene, perfluorodecene, perfluorooctadecene, perfluoro-3-methylbutene, other perfluoro branched chain perfluoroolefins containing the —$CF=CF_2$ group, methylperfluorovinyl ether, 2,3,3-trifluoroallyl acetate, piperidinyltrifluoroethylene, 3-chloroperfluoropropylene, and the like.

The reaction embodied herein is carried out at temperatures within the range of about 0° C. to about 150° C. The molar ratio of the substituted fluoroethylene to the carbocyclic N-oxide in the reaction mixture may be in the range of about 10:1 to about 1:10. The reaction is normally conducted at autogenous pressures, e.g., from about 50 to 200 p.s.i.g. depending, in general, on the vapor pressure of the substituted fluoroethylene and the mole ratios used. The product is recovered from the reaction mixture by the conventional techniques of washing with weak aqueous alkali to remove acidic by-products followed by water washing and drying with a solid desiccant. If desired, the substituted carbocyclic nitrogen compound can be refined by distillation at atmospheric or sub-atmospheric pressures.

The novel compounds of this invention are useful as plant growth regulators, that is, the compounds have the properties of defoliating, killing, and, in particular, inhibiting the growth of plants depending upon the amount used and the method of application of the compound to the plant life. In general, the rate of application to the vegetation to be treated is in the range of about 0.05 to about 10 pounds per acre. The compounds are applied in forms well known to the art, for example, as dispersions in water containing an emulsifying agent; as solutions in organic solvents such as acetone, dimethyl sulfoxide, dimethyl formamide, etc.; as solutions in mixtures of one of the above solvents with water; as oil-in-water emulsions obtained by dissolving the compound in a water-immiscible solvent such as xylene, kerosene, benzene, etc. and mixing this solution with water in the presence of an emulsifying agent such as long-chain alkyl benzene sulfonates or polyglycol ethers. The concentration of the plant growth regulator is normally from about 0.1 to about 10% by weight of the total formulation.

The following examples are set forth to illustrate exemplary embodiments of the method and the compounds of this invention, and should not be construed as limitative of the scope of the invention as defined by the appended claims.

EXAMPLE I 2-(1,2,2,2-tetrafluoroethyl)pyridine

To a stainless steel pressure vessel are charged 99.7 grams (1.045 mole) of pyridine N-oxide and 80 grams (0.534 mole) of hexafluoropropene, and the mixture is reacted at 62° C. for 16.5 hours. After the vessel is cooled and the gaseous products are vented, the liquid contents are added to 300 cc. of water and the mixture is made slightly alkaline by the addition of 50% aqueous KOH. A lower organic layer is separated and the upper aqueous phase is washed twice with methylene chloride. The washes are combined with the organic phase and the mixture is dried by slurrying with anhydrous magnesium sulfate crystals and separated therefrom by filtration. The methylene chloride is removed by flash evaporation under reduced pressure and the oily residue is distilled at 142° C. and 760 mm. Hg to yield 42 g. of colorless liquid product (conversion is 44% based on hexafluoropropylene charged) identified by infrared and nuclear magnetic resonance (NMR) spectral data as

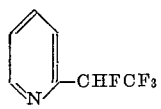

Elemental analysis of the product ($n_D$ 1.4109 at 25° C.) is as follows:

Found (percent): 44.96; H, 3.39; F, 42.89; N, 7.91. Molecular weight by the mass spectroscopy method, 179. Calculated for $C_7H_5F_4N$ (molecular weight, 179) (percent): C, 46.95; H, 2.81; F, 42.43; N, 7.82.

EXAMPLE II 6-(1,2,2,2-tetrafluoroethyl)-2-picoline

To a stainless steel pressure vessel are charged 14.5 g. (0.14 mole) of 2-picoline N-oxide and 10 g. (0.067 mole) of hexafluoropropylene, and the mixture is reacted at 68° C. for 67 hours. The vessel is cooled, bled of gaseous materials, and the crude liquid product is distilled at 25 to 63° C. and 0.013 to 0.1 mm. Hg to give 9.1 g. of yellow distillate which is purified by vapor phase chromatographic distillation to give a 19% yield (based on hexafluoropropene charged) of colorless liquid product identified by infrared and NMR spectral analysis as

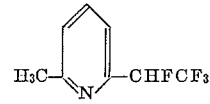

The product has these physical properties: $n_D$ 1.4189 at 25° C., boiling point, 154° C.

Elemental analysis.—Found (percent): C, 50.39; H, 4.14; F, 40.00; N, 7.39, molecular weight, 193. Calculated for $C_8H_7F_4N$ (mol. wt., 193) (percent): C, 49.75; H, 3.65; F, 39.34; N, 7.25.

EXAMPLE III 2- and 6-(1,2,2,2-tetrafluoroethyl)-3-picoline

To a pressure vessel are charged 0.2 mole of 3-picoline N-oxide and 0.1 mole of hexafluoropropylene which are reacted at 60° C. for 16.5 hours. The product is recovered and purified as in Example I. The conversion of the hexafluoropropene to the product is about 40%. Infrared and NMR spectral data indicate that the product is a mixture of the isomers

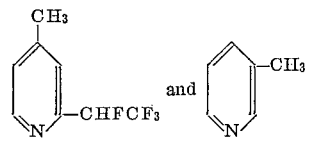

but predominantly the 2-isomer (i.e., about 80%).

The physical properties of the product are $n_D$ 1.4291 at 26° C.; B.P. 173°–174° C.

Elemental analysis.—Found (percent): C, 49.95; H, 4.17; F, 39.94; N, 7.25, molecular weight, 193. Calculated for (percent): $C_8H_7F_4N$: C, 49.75; H, 3.65; F, 39.34; N, 7.25, molecular weight, 193.

EXAMPLE IV 2-(1,2,2,2-tetrafluoroethyl)-4-picoline

To a pressure vessel are charged 0.2 mole of 4-picoline N-oxide and 0.1 mole of hexafluoropropylene which are reacted for about 18 hours at 47 to 74° C. The product, recovered in a 36% yield using the isolation techniques of Example II, has the structure

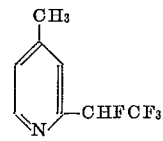

$n_D$ 1.4248 at 26° C.; B.P. 166° C.

Elemental analysis.—Found (percent): C, 50.46; H, 3.86; F, 39.33; N, 7.26. Molecular weight, 193. Calculated for (percent): $C_8H_7F_4N$: C, 49.75; H, 3.65; F, 39.34; N, 7.25. Molecular weight, 193.

EXAMPLE V 2- and 6-(1,2,2,2-tetrafluoroethyl)nicotinic acid

To a stainless steel pressure vessel are charged 75 g. pyridine, 41.7 g. (0.299 mole) nicotinic acid N-oxide, and 67.3 g. (0.449 mole) hexafluoropropylene. The mixture is heated with shaking for seven hours at 60° C. and then for 16 hours at about 25° C. The gases are bled from the reactor and its contents are mixed with water. This mixture is made alkaline with 50% aqueous NaOH and extracted with methylene chloride solvent to remove organic by-products. The aqueous layer is filtered and treated with concentrated aqueous hydrochloric acid to pH 2. A white precipitate forms and is recovered by filtration and recrystallized from hot water. The conversion of nicotinic acid N-oxide to the product is about 8%. It is identified by NMR analysis as a mixture of isomers having the structures

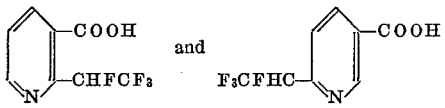

M.P. 144–174° C.

*Elemental analysis.*—Found (percent): C, 43.15; H, 2.45; N, 5.97; F, 31.60. Calculated for $C_8H_5F_4NO_2$ (percent): C, 43.06; H, 2.26; N, 6.28; F, 34.06

Each of the compounds prepared in the foregoing examples was tested for its efficacy in plant growth inhibition using a formula comprising a mixture of said compound, xylene, water and "Triton X–155" emulsifier, applied to the Black Valentine bean plant. 2-(1,2,2,2-tetrafluoroethyl) pyridine gave 50% and 75% growth inhibition at rates of application of 1.0 and 5.0 lbs./acre. The other fluoroalkylpyridines gave 50% growth inhibition at the same dosages.

We claim:

1. The method of preparing a substituted pyridine compound having a substituent represented by CHFR on a ring carbon atom which is a position alpha to the ring nitrogen of a radical selected from the group consisting of pyridine and substituted pyridine wherein the substituents are alkyl of 1 to 18 carbon atoms, carboxy, methoxy hydroxy, carbethoxy, amino, carboamido, or chlorine, which comprises reacting, at 0° C. to 150° C., a monosubstituted fluoroethylene of the formula $RCF=F_2$, wherein R is selected from the class consisting of perfluoroalkyl and perfluorochloroalkyl radicals having 1 to 18 carbon atoms, said perfluorochloroalkyl radicals having a ratio of fluorine to chlorine atoms of at least 1:1, with a pyridine reactant selected from the class consisting of pyridine N-oxides and substituted pyridine N-oxides wherein said substituents are as defined above, at least one of the alpha carbon atoms of said pyridine reactant being unsubstituted.

2. The method of claim 1 wherein $RCF=CF_2$ is hexafluoropropene.

3. α-(1,2,2,2-tetrafluoroethyl)-nicotinic acid.

References Cited

UNITED STATES PATENTS 2,862,024 11/1958 Rendall et al. _____ 260—487

OTHER REFERENCES

Janz et al., J. Org. Chem. 29(3), 569–71 (3/1964).
Janz et al., Org. Chem. 30(4), 1249–50 (4/1965).

HENRY R. JILES, Primary Examiner

C. M. SHURKO, Assistant Examiner

U.S. Cl. X.R.

260—250, 251, 283, 287, 289, 295, 290, 296, 297; 71—74, 92, 94

PO-1050
(5/69)

UNITED STATES PATENT OFFICE
CERTIFICATE OF CORRECTION

Patent No. 3,534,056      Dated October 13, 1970

Inventor(s) Everett A. Mailey - Luke R. Ocone

It is certified that error appears in the above-identified patent and that said Letters Patent are hereby corrected as shown below:

Claim I, column 5, line 3, after "is", insert -- in --;

Claim I, column 5, line 7, "carboamido", should read -- carboxamido --;

Claim I, column 6, line 2, the formula "$RCF=F_2$", should read -- $RCF=CF_2$ --.

SIGNED AND SEALED
DEC 15 1970

(SEAL)
Attest:

Edward M. Fletcher, Jr.
Attesting Officer

WILLIAM E. SCHUYLER, JR.
Commissioner of Patents